United States Patent
Brehmer et al.

(10) Patent No.: US 10,647,191 B2
(45) Date of Patent: May 12, 2020

(54) TRANSMISSION FOR A MOTOR VEHICLE

(71) Applicant: ZF Friedrichshafen AG, Friedrichshafen (DE)

(72) Inventors: Martin Brehmer, Tettnang (DE); Michael Herrmann, Stetten (DE)

(73) Assignee: ZF FRIEDRICHSCHAFEN AG, Friedrichshafen (DE)

( * ) Notice: Subject to any disclaimer, the term of this patent is extended or adjusted under 35 U.S.C. 154(b) by 0 days.

(21) Appl. No.: 16/325,468

(22) PCT Filed: Jul. 24, 2017

(86) PCT No.: PCT/EP2017/068650
§ 371 (c)(1),
(2) Date: Feb. 14, 2019

(87) PCT Pub. No.: WO2018/033346
PCT Pub. Date: Feb. 22, 2018

(65) Prior Publication Data
US 2019/0210447 A1    Jul. 11, 2019

(30) Foreign Application Priority Data
Aug. 16, 2016  (DE) .................. 10 2016 215 184

(51) Int. Cl.
*B60K 6/365*   (2007.10)
*B60K 6/40*    (2007.10)
(Continued)

(52) U.S. Cl.
CPC ............. *B60K 6/365* (2013.01); *B60K 6/40* (2013.01); *F16H 57/0446* (2013.01);
(Continued)

(58) Field of Classification Search
CPC .. B60K 6/365; B60K 6/40; B60K 2006/4825; F16H 57/0446; F16H 57/0476; F16H 2057/02034
See application file for complete search history.

(56) References Cited

U.S. PATENT DOCUMENTS 4,805,490 A   2/1989 Fuehrer et al.
5,611,372 A   3/1997 Bauer et al.
(Continued)

FOREIGN PATENT DOCUMENTS

DE   9307228 U1   7/1993
DE   4344584 A1   6/1995
(Continued)

OTHER PUBLICATIONS

German Search Report DE102016215184.3, dated Apr. 12, 2017. (12 pages).
(Continued)

*Primary Examiner* — Bryan A Evans
(74) *Attorney, Agent, or Firm* — Dority & Manning, P.A.

(57) ABSTRACT

A transmission for a motor vehicle includes a hydraulic transmission control unit, a transmission housing, an oil pan mounted onto the transmission housing, and a power electronics unit which acts as a power converter for an electric machine and is supported on the transmission housing and/or the oil pan. The hydraulic transmission control unit and the power electronics unit are at least partially arranged next to each other tangentially and/or axially relative to a transmission central axis.

16 Claims, 8 Drawing Sheets

(51) Int. Cl.
  *F16H 57/04* (2010.01)
  *F16H 57/02* (2012.01)
  *B60K 6/48* (2007.10)

(52) U.S. Cl.
  CPC .. *F16H 57/0476* (2013.01); *B60K 2006/4825* (2013.01); *F16H 2057/02034* (2013.01)

(56) References Cited

U.S. PATENT DOCUMENTS

| | | |
|---|---|---|
| 7,073,410 B2 | 7/2006 | Albert |
| 2004/0134549 A1 | 7/2004 | Albert |
| 2010/0106394 A1 | 4/2010 | Seufert et al. |
| 2010/0147105 A1 | 6/2010 | Schoen |

FOREIGN PATENT DOCUMENTS

| | | |
|---|---|---|
| DE | 10101091 A1 | 7/2002 |
| DE | 102008054637 A1 | 6/2010 |
| DE | 102014204088 A1 | 9/2015 |
| WO | WO 94/27067 | 11/1994 |
| WO | WO 02/055907 A1 | 7/2002 |
| WO | WO 2005/100777 A2 | 10/2005 |
| WO | WO-2005100777 A2 * | 10/2005 ............. B60K 6/387 |

OTHER PUBLICATIONS

International Search Report (English Translation) PCT/EP2017/068650, dated Oct. 24, 2017. (2 pages).

Audi: 6-Gang Automatikgetriebe 09E im Audi A8'03 Teil 1. Ingolstadt : Audi, Oct. 2002 (Selbststudienprogramm 283). Seiten: 13, 14.—ISBN—p. 0.

Audi: 6-Gang Automatikgetriebe 09E im Audi A8'03 Teil 2. Selbststudienprogramm 284, Oct. 2002, Seiten: 4, 12. Internet [online]. p. 0.

VW: Amarok 2012—Das 8-Gang-Automatikgetriebe 0CM. Selbststudienprogramm Technik, 507, Jan. 2012, Seite: 22, 23.— [online]. p. 0.

* cited by examiner

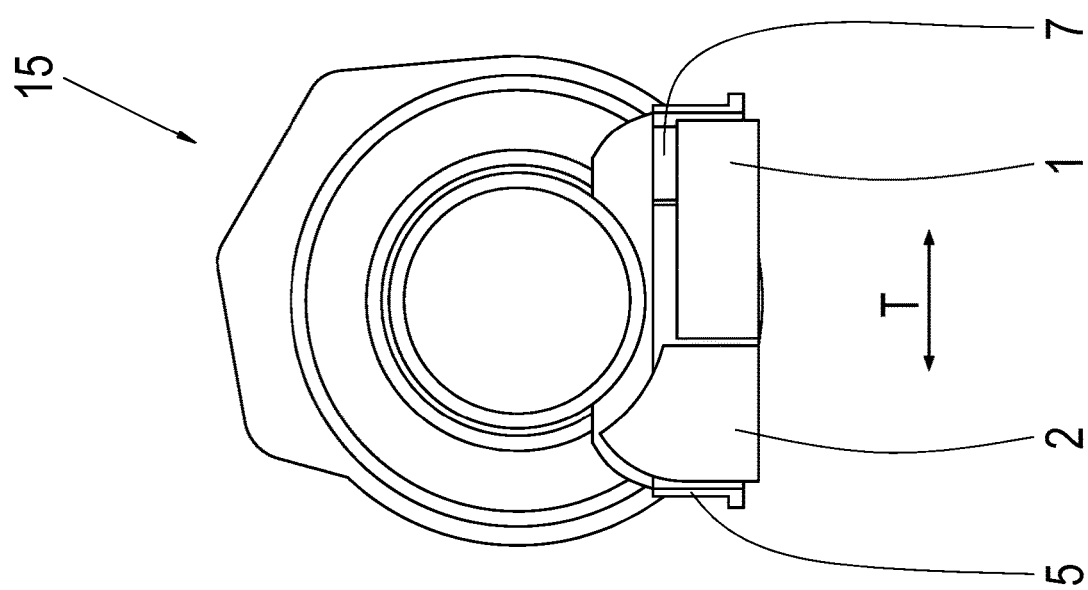
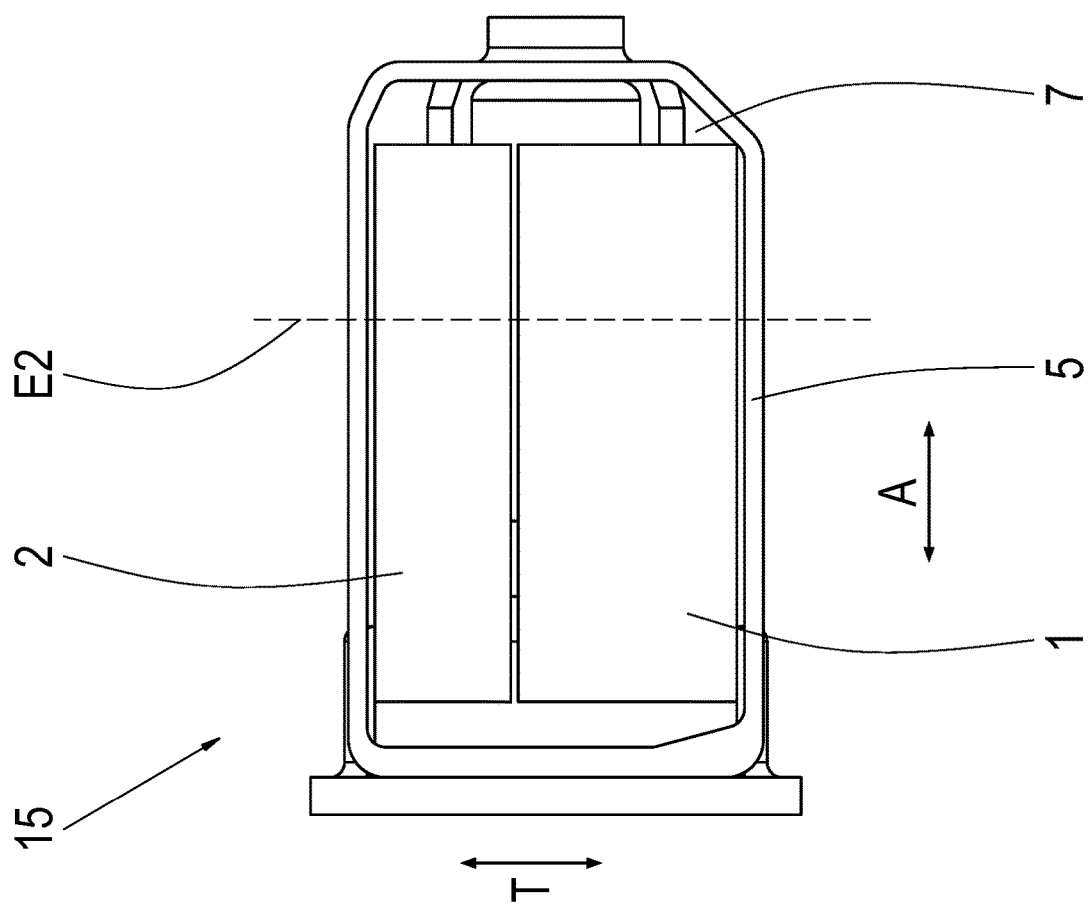

TRANSMISSION FOR A MOTOR VEHICLE

FIELD OF THE INVENTION

The invention relates generally to a transmission for a motor vehicle that includes a hydraulic transmission control unit, a transmission housing, an oil pan mounted onto the transmission housing, and a power electronics unit which acts as a power converter for an electric machine and is supported on the transmission housing and/or the oil pan. The invention also relates to a hybrid drive with such a transmission. In addition, the invention relates to a motor vehicle with the transmission or the hybrid drive.

BACKGROUND

A multitude of vehicles is known from the prior art, in the case of which the power electronics unit is located in the vehicle. This is necessary, since there is not enough installation space available in the transmission for accommodating the power electronics unit. Therefore, installation space for the power electronics unit must be made available in the vehicle, which is considered by the vehicle manufacturers to be disadvantageous. In addition, the power electronics unit is often mounted at points on the vehicle located far from the transmission. Therefore, long wiring harnesses must be utilized in order to connect the vehicle battery to the power electronics unit and in order to connect the power electronics unit to an electric machine. In particular, an alternating current (AC) cable extends from the power electronics unit to the transmission.

SUMMARY OF THE INVENTION

Example aspects of the invention provide a transmission, with the aid of which the aforementioned disadvantages can be avoided.

According to example aspects of the invention, a transmission of the type mentioned at the outset is configured such that the hydraulic transmission control unit and the power electronics unit are arranged next to one another tangentially and/or axially, at least in sections, relative to a transmission central axis.

According to example aspects of the invention, it has been found that the installation space next to the hydraulic transmission control unit may be utilized for the arrangement of the power electronics unit. Due to the fact that the power electronics unit and the hydraulic transmission control unit are arranged next to one another in the tangential direction and/or the axial direction, it is no longer necessary to provide installation space for the power electronics unit in the vehicle. In addition, the length of the required electrical lead is reduced, since there is no longer a need to bridge the distance between the power electronics unit and the transmission. Yet another advantage of the invention is that there is no longer a need to utilize an AC cable. The vehicle, in particular, the vehicle battery, and the power electronics unit now only need to be connected to a DC cable. There are cost advantages as well, since fewer system interfaces are present.

As used herein, the directional information "axial direction", "radial direction", and "tangential direction" relates to the transmission central axis in each case.

As mentioned at the outset, the power electronics unit acts as a power converter for the electric machine. In particular, the power electronics unit is utilized for converting the direct current provided by a battery into an alternating current. In addition, the power electronics unit is essentially utilized for the open-loop or closed-loop control of the current supplied to the electric machine. For this purpose, the power electronics unit includes a printed circuit board and electronic components electrically connected thereto, which are configured for the open-loop or closed-loop control of the current. For example, the power electronics unit may comprise a circuit-breaker, such as a power transistor. In addition, the power electronics unit may include an electronic control unit and/or sensor electronics. The power electronics unit may include a power electronics housing, within which the printed circuit board and the electronic components are arranged. The power electronics unit may have a modular design, and so the power electronics unit can be preassembled as a complete unit.

The electric machine includes at least a stator and a rotatably mounted rotor and is configured for converting electrical energy into mechanical energy in the form of rotational speed and torque when operated as a motor and for converting mechanical energy into electrical energy in the form of current and voltage when operated as a generator. The electric machine may be utilized in a hybrid drive, in which case the power provided by the electric machine is transmitted to a transmission output shaft. The electric machine may be utilized for other purposes, of course, such as for driving a pump arranged in the transmission. The power electronics unit may be electrically conductively connected to one or multiple electric machines.

A hydraulic transmission control unit is understood to be a component, with the aid of which a defined distribution of pressures and/or oil flows may be implemented between the pump of the transmission and the particular hydraulic consumers of the transmission, such as clutches, cooling oil lines, and the like. Preferably, the hydraulic transmission control unit includes direct control valves and/or spool-type gate pressure regulators, whereby a small configuration of the hydraulic transmission control unit is possible. Due to the small configuration of the hydraulic transmission control unit, there is sufficient installation space for the power electronics unit in the axial direction and/or the tangential direction of the transmission housing.

The power electronics unit and the hydraulic transmission control unit are arranged directly or indirectly next to one another in the tangential direction and/or the axial direction. The power electronics unit and the hydraulic transmission control unit are spaced apart from the transmission central axis in the radial direction. The power electronics unit and the hydraulic transmission control unit are arranged directly next to one another when there are no further components arranged between the power electronics unit and the hydraulic transmission control unit in the tangential direction and/or the axial direction. The power electronics unit and the hydraulic transmission control unit are arranged indirectly next to one another when there are components, such as an oil pan wall, arranged between the power electronics unit and the hydraulic transmission control unit in the axial direction and/or the tangential direction.

The power electronics unit may be designed in such a way that a first section of the power electronics unit is arranged in the axial direction next to the hydraulic transmission control unit and a second section of the power electronics unit is arranged in the tangential direction next to the hydraulic transmission control unit. This is the case, in particular, when the power electronics unit is L-shaped, as described in greater detail in the following.

In one particular embodiment, the hydraulic transmission control unit and the power electronics unit may be arranged in a plane. The plane extends in the tangential direction and in the axial direction. The transmission central axis is not an integral part of the plane and the plane is spaced apart from the transmission central axis in the radial direction. The power electronics unit and the hydraulic transmission control unit are arranged tangentially next to one another when a straight line, which is parallel to the tangential direction, extends through the power electronics unit as well as through the hydraulic transmission control unit and/or when the power electronics unit is arranged in another plane which extends in the tangential direction and in the radial direction. In addition, the power electronics unit and the hydraulic transmission control unit are arranged axially next to one another when another straight line, which is parallel to the axial direction, extends through the power electronics unit as well as through the hydraulic transmission control unit and/or when the power electronics unit and the hydraulic transmission control unit are arranged in an additional plane which extends in the axial direction and in the radial direction.

In addition, the power electronics unit may be offset with respect to the hydraulic transmission control unit. This means, the power electronics unit and the hydraulic transmission control unit are not arranged one over the other or one below the other in the radial direction.

The hydraulic transmission control unit may be arranged in a cavity of the oil pan which is integrally connected to the transmission housing. The transmission housing may encase a transmission unit which includes multiple planetary gear sets and/or multiple gearwheels, with the aid of which different gear steps can be implemented. The transmission unit is arranged in a cavity of the transmission housing. The oil pan may extend, relative to the transmission central axis, from the transmission housing in the radial direction, in particular, in the direction toward the road bed.

The power electronics unit may be arranged outside the cavity of the oil pan and/or outside the cavity of the transmission housing. Thus, the power electronics unit may rest against the transmission housing, in particular, an outer side of the transmission housing, and/or against an oil pan wall, in particular, an outer side of the oil pan wall, of the oil pan. In particular, the power electronics unit may be detachably attached to the transmission housing and/or to the oil pan wall. The power electronics unit may rest directly against the transmission housing and/or the oil pan wall, and so a compact design of the transmission can be implemented. In particular, the power electronics unit may be arranged underneath the transmission housing, in the radial direction.

Due to the arrangement and/or the attachment of the power electronics unit on or to the transmission housing and/or the oil pan, it is also possible, in an easy way, to achieve a support of the power electronics unit, in particular, in the radial direction, on the transmission housing and/or the oil pan. In the end, the power electronics unit does not need to be supported, for example, by other vehicle components.

In one particular embodiment, a power electronics unit base and an oil pan plate are arranged in the plane or in one further plane which is parallel to the plane. As a result, it is ensured that the power electronics unit and the oil pan extend equally far away from the transmission central axis in the radial direction. This is advantageous because no additional installation space for the power electronics unit is required in the radial direction, and so a transmission which is compact in the radial direction can be implemented. An oil pan plate is utilized for closing the cavity of the oil pan and therefore prevents the oil in the transmission from flowing out of the transmission.

In one alternative embodiment, the power electronics unit may be arranged in the cavity of the oil pan. In this embodiment as well, the power electronics unit may rest against the transmission housing, in particular, an inner side of the transmission housing, and/or against an oil pan wall, in particular, an inner side of the oil pan wall, of the oil pan. In particular, the power electronics unit may be detachably attached to the transmission housing and/or to the oil pan wall. Alternatively or additionally, the power electronics unit may rest directly against the hydraulic transmission control unit and/or may be detachably attached thereto.

The power electronics unit base and a base of the hydraulic transmission control unit may be arranged in the plane or in one further plane which is parallel to the plane. In the end, it is ensured that the power electronics unit does not require more installation space in the radial direction than the hydraulic transmission control unit, and so the oil pan can be designed to be compact in the radial direction.

In one particular embodiment, the power electronics unit may be L-shaped and/or the hydraulic transmission control unit may be L-shaped. In this case, a crosspiece of the power electronics unit may extend in the axial direction, and a leg of the power electronics unit may extend in the tangential direction. Similarly, a crosspiece of the hydraulic transmission control unit may extend in the axial direction, and a leg of the hydraulic transmission control unit may extend in the tangential direction. Due to such a design of the power electronics unit and/or of the hydraulic transmission control unit, a design can be implemented, which is compact, in particular, in the axial direction.

A compact design is implemented when the power electronics unit and the hydraulic transmission control unit are arranged in such a way that a leg of the power electronics unit at least partially encloses a crosspiece head of the hydraulic transmission control unit and/or a leg of the hydraulic transmission control unit at least partially encloses a crosspiece head of the power electronics unit.

In addition, an embodiment is advantageous, in which the power electronics unit is designed and arranged in such a way that the power electronics unit is flush with the oil pan. In particular, the power electronics unit may be arranged in such a way that a side of the power electronics unit extending in the axial direction and an oil pan wall of the oil pan are not offset with respect to one another in the tangential direction.

A hybrid drive including a transmission and an electric machine is very particularly advantageous, wherein the electric machine is electrically conductively connected to the power electronics unit. The electric machine may be operatively connected to a transmission shaft, such as a transmission input shaft. In addition, a transmission output shaft may be driven by the electric machine depending on an operating condition of the transmission, such as an engaged gear. Operating conditions of the transmission may also exist, in which the electric machine is not activated and the transmission output shaft may be driven, in particular, exclusively, by a motor vehicle drive unit of the vehicle.

The electric machine may be operatively connected to the transmission shaft directly or indirectly, such as with the aid of transmission gearing. The electric machine may be an integral part of the transmission and/or may be integrated in the transmission. Alternatively, the electric machine may be designed as a modular unit which is connected to the transmission and/or is mounted onto the transmission.

The transmission may be an automated transmission. In addition, a motor vehicle including the motor vehicle drive unit, such as an internal combustion engine, a transmission according to example aspects of the invention, or a hybrid drive according to example aspects of the invention, is advantageous, wherein the motor vehicle drive unit is operatively connected to the transmission or to the hybrid drive or may be operatively connected thereto with the aid of a shift element, in particular, a clutch.

BRIEF DESCRIPTION OF THE DRAWINGS

The subject matter of the invention, according to various example aspects, is schematically represented in the figures and is described in the following with reference to the figures, wherein identical or identically operating elements are mostly provided with the same reference characters. Wherein:

FIG. 12 shows a bottom view of the transmission according to the invention, according to a fourth exemplary embodiment, without an oil pan plate;

FIG. 13 shows a cross-sectional view of the transmission according to the invention, according to the fourth exemplary embodiment.

DETAILED DESCRIPTION

Figure 1:
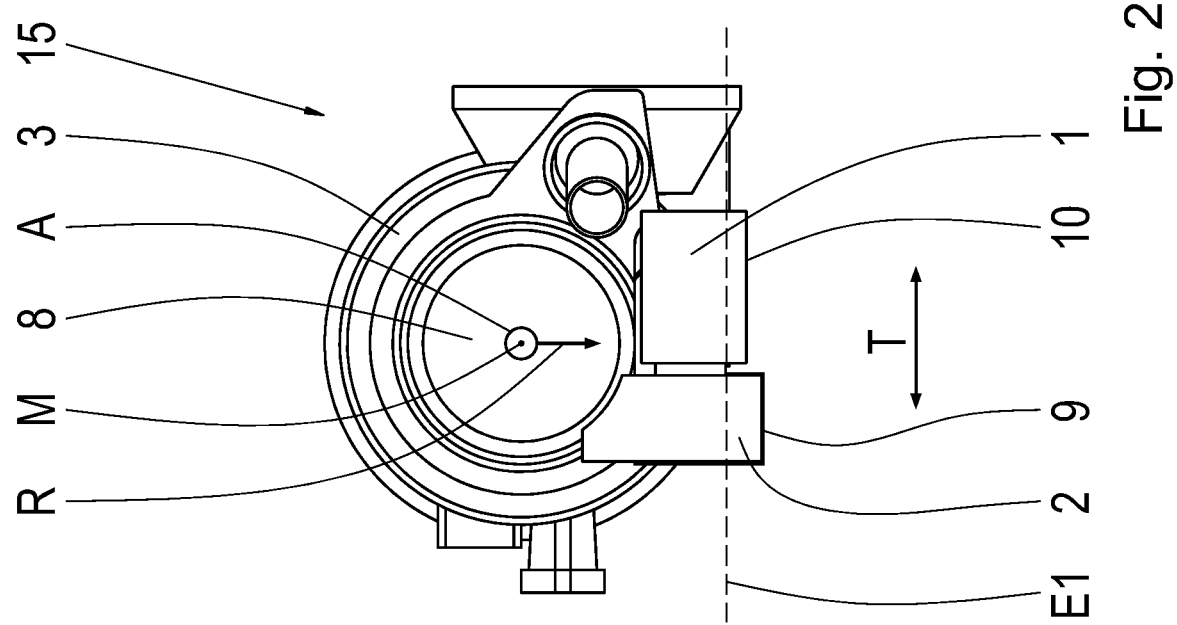
FIG. 1 shows a bottom view of the transmission according to the invention, according to a first exemplary embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The transmission 15 according to a first exemplary embodiment, which is represented in FIG. 1, includes a hydraulic transmission control unit 1 and a power electronics unit 2. The hydraulic transmission control unit 1 and the power electronics unit 2 are arranged tangentially next to one another relative to a transmission central axis M. In addition, as is apparent from FIG. 2, the hydraulic transmission control unit 1 and the power electronics unit 2 are arranged in a plane E1 which extends in the tangential direction T and in the axial direction A. In this case, the hydraulic transmission control unit 1 and the power electronics unit 2 lie indirectly next to one another in a tangential direction T.

Due to the fact that the hydraulic transmission control unit 1 and the power electronics unit 2 are arranged next to one another in the tangential direction T, the hydraulic transmission control unit 1 and the power electronics unit 2 are arranged in another plane E2 which extends in the tangential direction T and in the radial direction R. The other plane E2 is perpendicular to the plane E1.

The transmission 15 includes a transmission housing 3 and an oil pan 4. The oil pan 4 is delimited by an oil pan wall 5 and includes an oil pan plate 6 represented in FIG. 3. The hydraulic transmission control unit 1 is arranged in a cavity 7 of the oil pan 4. On the other hand, the power electronics unit 2 is arranged outside the oil pan 4, namely underneath the transmission housing 3 in the radial direction R. In addition, the power electronics unit 2 and the oil pan 4 are designed and arranged in such a way that the power electronics unit 2 is flush with the oil pan 4, in particular, the oil pan wall 5. This means, the power electronics unit 2 and the oil pan wall 5 are not offset with respect to one another in the tangential direction T. The power electronics unit 2 is connected to the transmission housing 3 and/or the oil pan 4 and, therefore, is supported on the transmission housing 3 and/or the oil pan 4.

Figure 2:
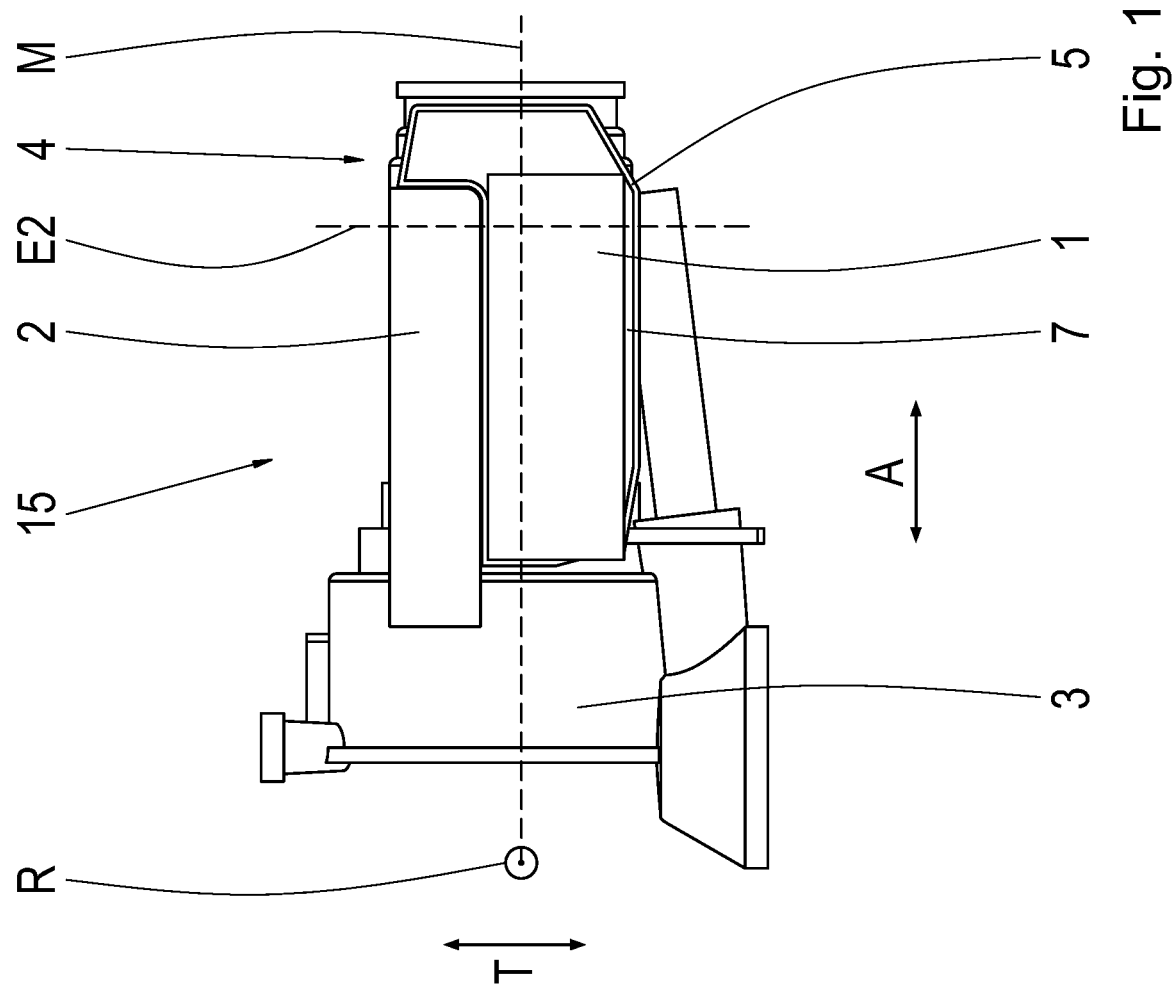
FIG. 2 shows a cross-sectional view of the transmission according to the invention, according to the first exemplary embodiment.

FIG. 2 shows a cross-sectional view of the transmission 15 along the other plane E2. The transmission housing 3 encloses a cavity 8, in which a transmission unit is arranged, which is not shown in the figures. A power electronics unit base 9 is arranged further away, in the radial direction R, than a base 10 of the hydraulic transmission control unit 1. In addition, it is apparent from FIG. 2 that the power electronics unit 2 is offset, in the tangential direction T, with respect to the hydraulic transmission control unit 1. Therefore, there is no section of the power electronics unit 2 which is arranged above or below the hydraulic transmission control unit in the radial direction R. The plane E1 is spaced apart from the transmission central axis M in the radial direction R.

Figure 3:
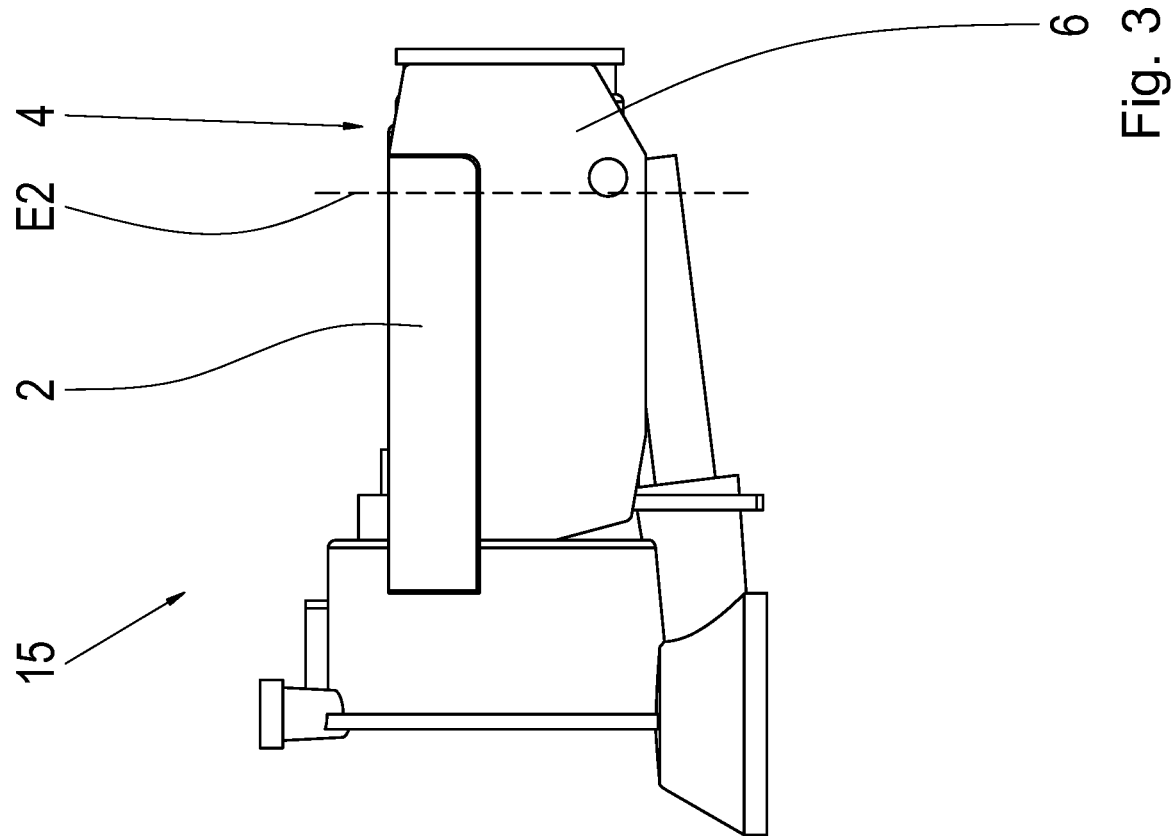
FIG. 3 shows a bottom view of the transmission according to the invention, according to the first exemplary embodiment, including an oil pan plate.

FIG. 3 shows a bottom view of the transmission 15 shown in FIGS. 1 and 2, although including an oil pan plate 6. The oil pan plate 6 closes the cavity 7 of the oil pan 4 in the radial direction R, and so oil located in the cavity 7 cannot flow out of the cavity 7. The oil pan plate 6 may be detachably connected to the oil pan wall 5 with the aid of a bolted connection. The oil pan 4 is designed to be essentially L-shaped.

Figure 4:
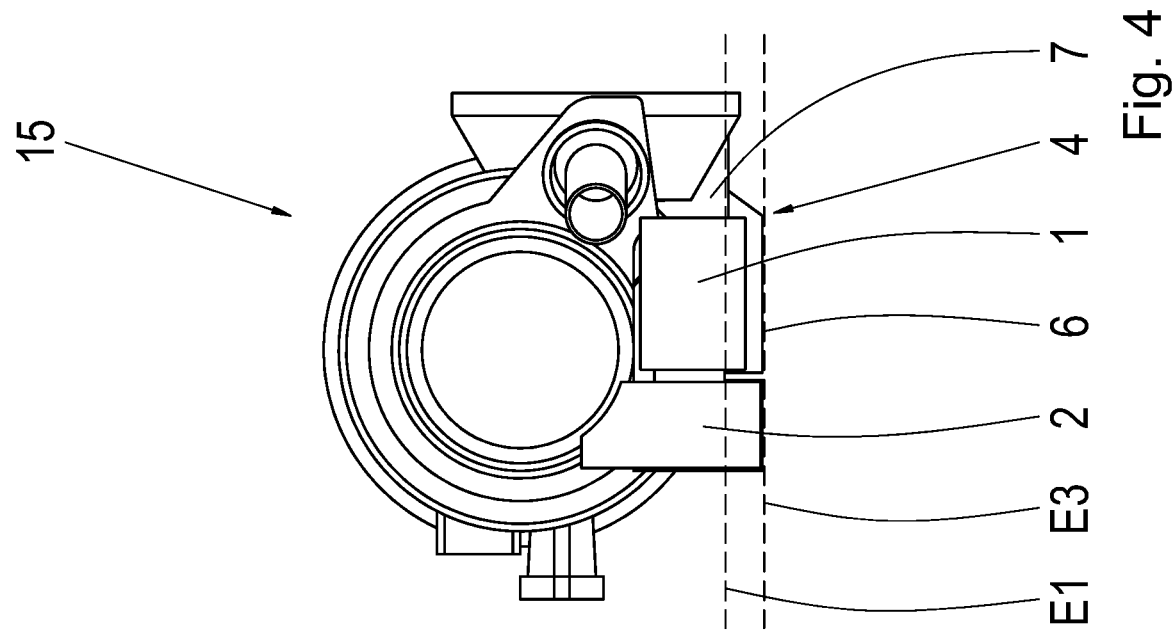
FIG. 4 shows a cross-sectional view of the transmission according to the invention, according to the first exemplary embodiment, including the oil pan plate.

FIG. 4 shows the cross-sectional view of the transmission 15, which is represented in FIG. 3, along the other plane E2. The power electronics unit 2 and the oil pan 4 are arranged and/or designed in such a way that the power electronics unit base 9 and the oil pan plate 6 are arranged in one further plane E3. The further plane E3 extends in parallel to the plane E1.

Figure 5:
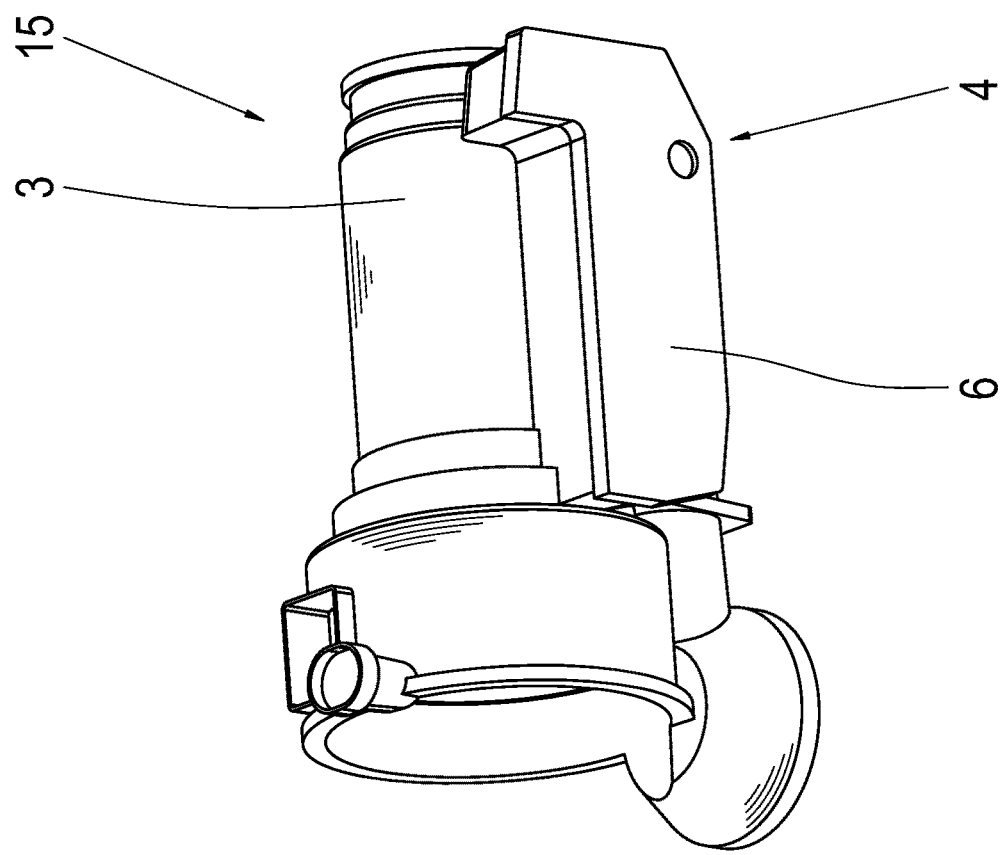
FIG. 5 shows a perspective representation of the transmission according to the invention, according to the first exemplary embodiment, without a power electronics unit.
Figure 6:
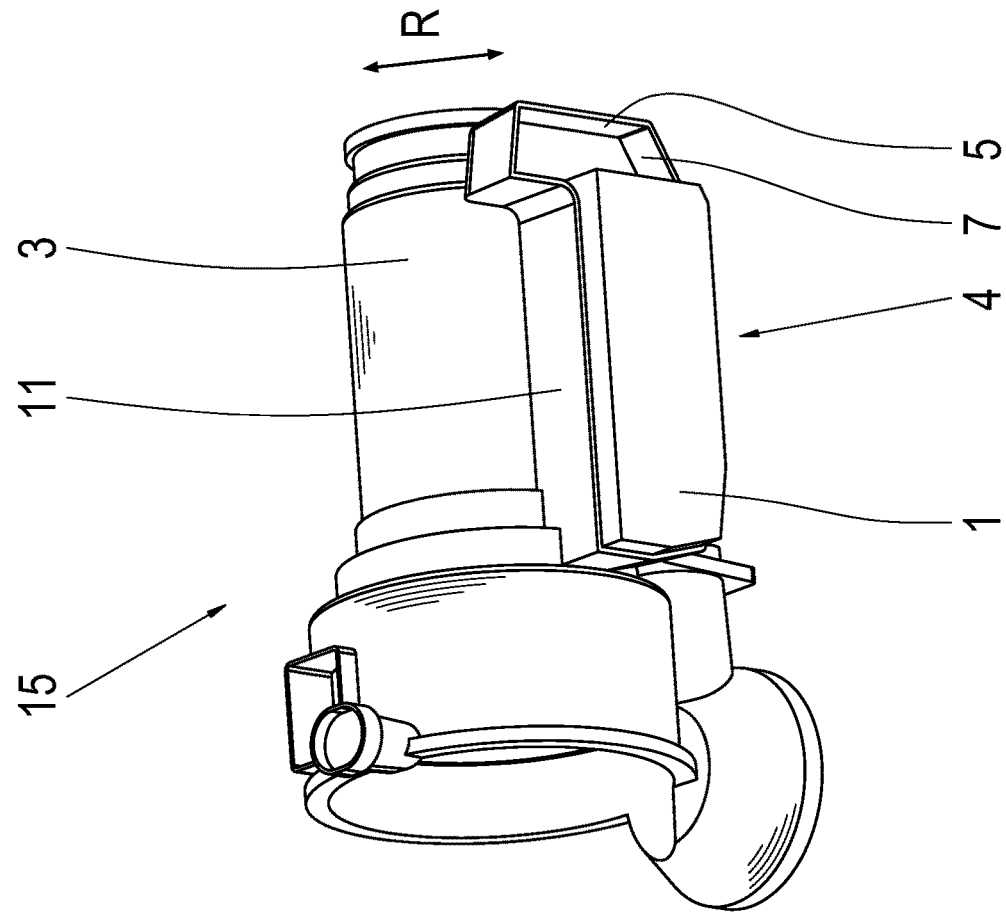
FIG. 6 shows a perspective representation of the transmission according to the invention, according to the first exemplary embodiment, including an oil pan plate and without a power electronics unit.

FIG. 5 shows a perspective representation of the transmission 15 according to the first exemplary embodiment, without an oil pan plate, and FIG. 6 shows a perspective representation of the transmission 15 according to the first exemplary embodiment, including the oil pan plate 6. The oil pan 4 extends from the transmission housing 3 in the radial direction R and is integrally connected to the transmission housing 3. A protrusion 11, in which the power electronics unit 2 may be arranged, is apparent in FIGS. 5 and 6.

Figure 7:
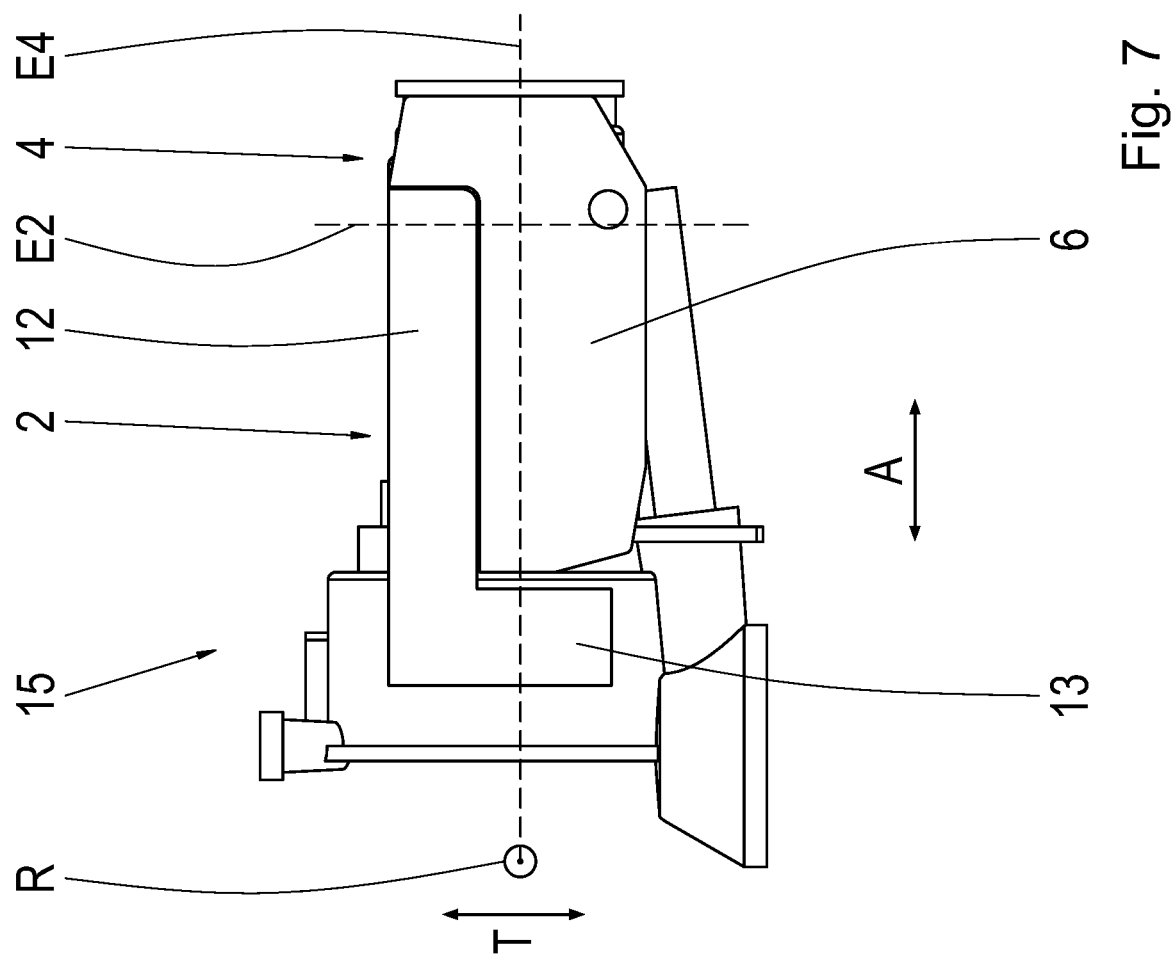
FIG. 7 shows a bottom view of the transmission according to the invention, according to a second exemplary embodiment.

FIG. 7 shows a bottom view of the transmission 15 according to the invention, according to a second exemplary embodiment. The transmission 15 differs from the transmissions represented in FIGS. 1 through 6 with respect to the embodiment of the power electronics unit 2. The power electronics unit 2 is L-shaped.

In the second exemplary embodiment, the power electronics unit 2 and the hydraulic transmission control unit 1 are arranged tangentially and axially next to one another. In this case, as is apparent from FIG. 8, the power electronics unit 2 and the hydraulic transmission control unit 1 are arranged in the plane E1. In addition, the hydraulic transmission control unit 1 and the power electronics unit 2 are arranged in the other plane E2, in a manner analogous to the first exemplary embodiment.

Due to the fact that the power electronics unit 2 and the hydraulic transmission control unit 1 are arranged next to one another in the axial direction A, the hydraulic transmission control unit 1 and the power electronics unit 2 are arranged in an additional plane E4 which extends in the axial direction A and in the radial direction R and is perpendicular to the plane E1 and to the other plane E2. In this case, the power electronics unit 2 and the hydraulic transmission control unit 1 are arranged indirectly next to one another in the axial direction and in the tangential direction, since the oil pan wall 5 is arranged between the power electronics unit 2 and the hydraulic transmission control unit 1. Although the hydraulic transmission control unit 1 is not represented in FIG. 7, it is designed and arranged in a manner similar to that of the hydraulic transmission control unit 1 represented in FIG. 1.

The power electronics unit 2 includes a crosspiece 12 which extends in the axial direction A and is arranged in the protrusion 11 shown in FIG. 5. The power electronics unit 2 also includes a leg 13 which extends in the tangential direction T and is connected to the crosspiece 12. The leg 13 encloses a part of the oil pan 4.

Figure 8:
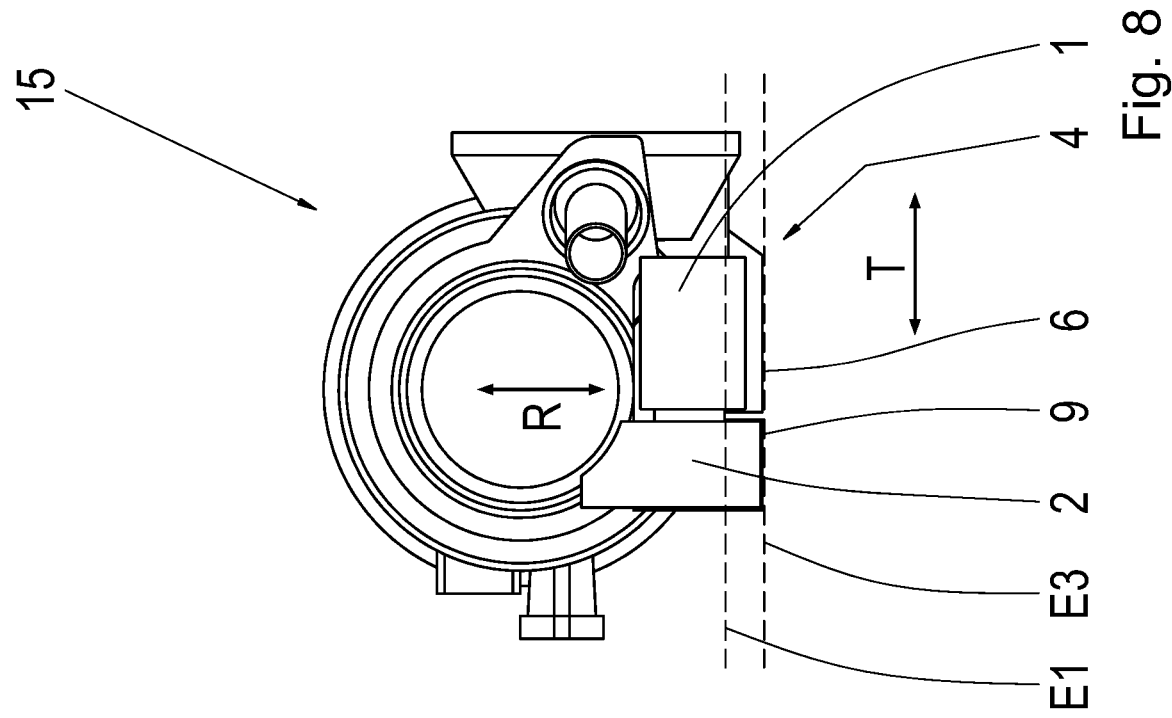
FIG. 8 shows a cross-sectional view of the transmission according to the invention, according to the second exemplary embodiment.

FIG. 8 shows a cross-sectional view of the transmission 15, which is represented in FIG. 7, along the other plane E2. In the second exemplary embodiment as well, the power electronics unit 2 is designed and arranged in such a way that the power electronics unit base 9 and the oil pan plate 6 are arranged in the further plane E3, in a manner analogous to the first exemplary embodiment. In addition, it is apparent from FIG. 8 that the power electronics unit 2 is offset, in the tangential direction T, with respect to the hydraulic transmission control unit 1. Therefore, there is no section of the power electronics unit 2 which is arranged above or below the hydraulic transmission control unit 1 in the radial direction R.

Figure 9:
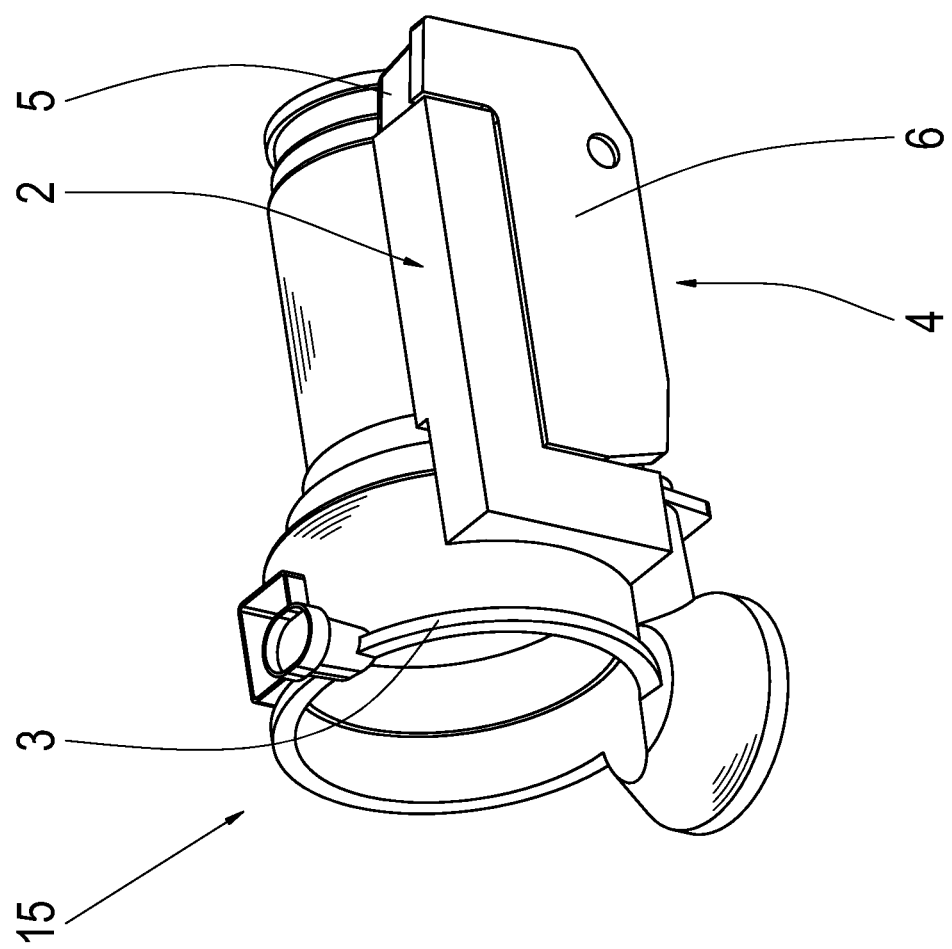
FIG. 9 shows a perspective view of the transmission according to the invention, according to the second exemplary embodiment.

FIG. 9 shows a perspective representation of the transmission represented in FIGS. 7 and 8. As is apparent from FIG. 9, the power electronics unit 2 rests directly against the oil pan 4, in particular, the oil pan wall 5, and the transmission housing 3.

Figure 10:
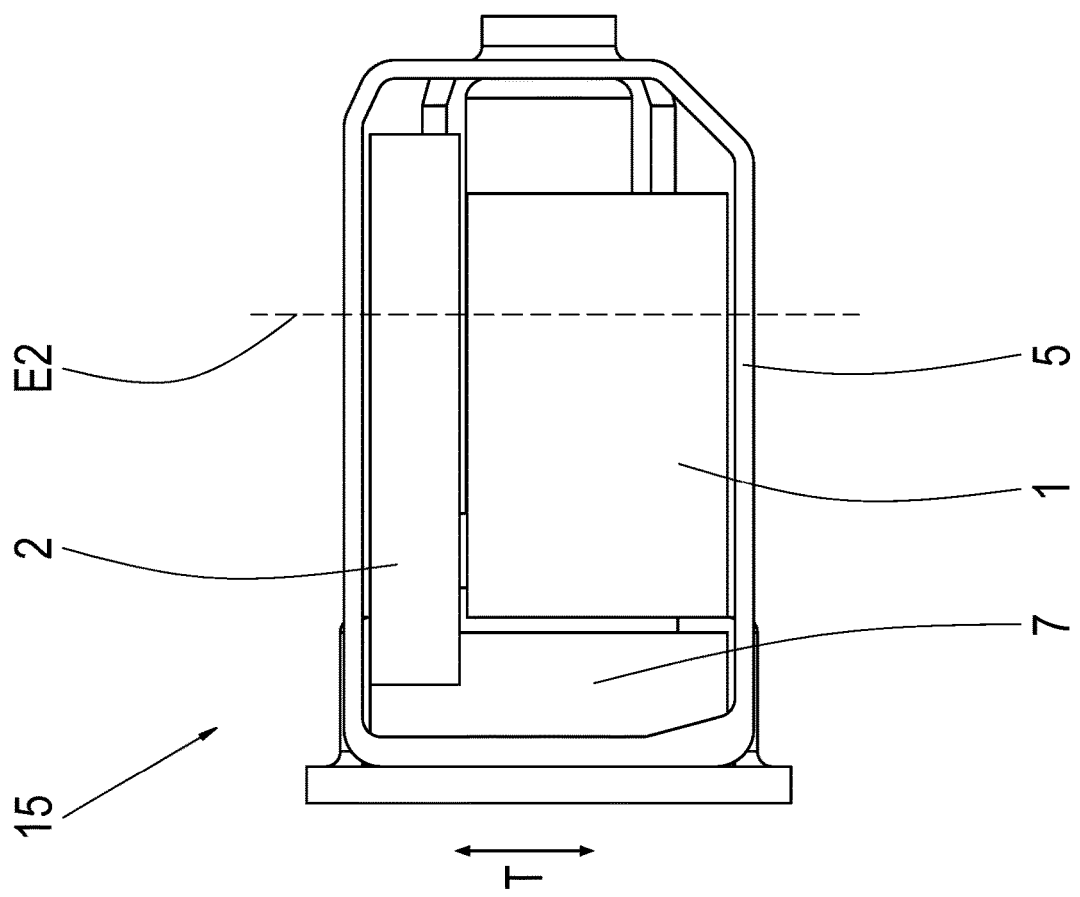
FIG. 10 shows a bottom view of the transmission according to the invention, according to a third exemplary embodiment, without an oil pan plate.

FIG. 10 shows a bottom view of a transmission 15 according to the invention, according to a third exemplary embodiment, without an oil pan plate. The third exemplary embodiment differs from the first and the second exemplary embodiments in that the power electronics unit 2 is arranged in the cavity 7 of the oil pan 4. In this exemplary embodiment, the power electronics unit 2 and the hydraulic transmission control unit 1 lie next to one another in the tangential direction T.

Figure 11:
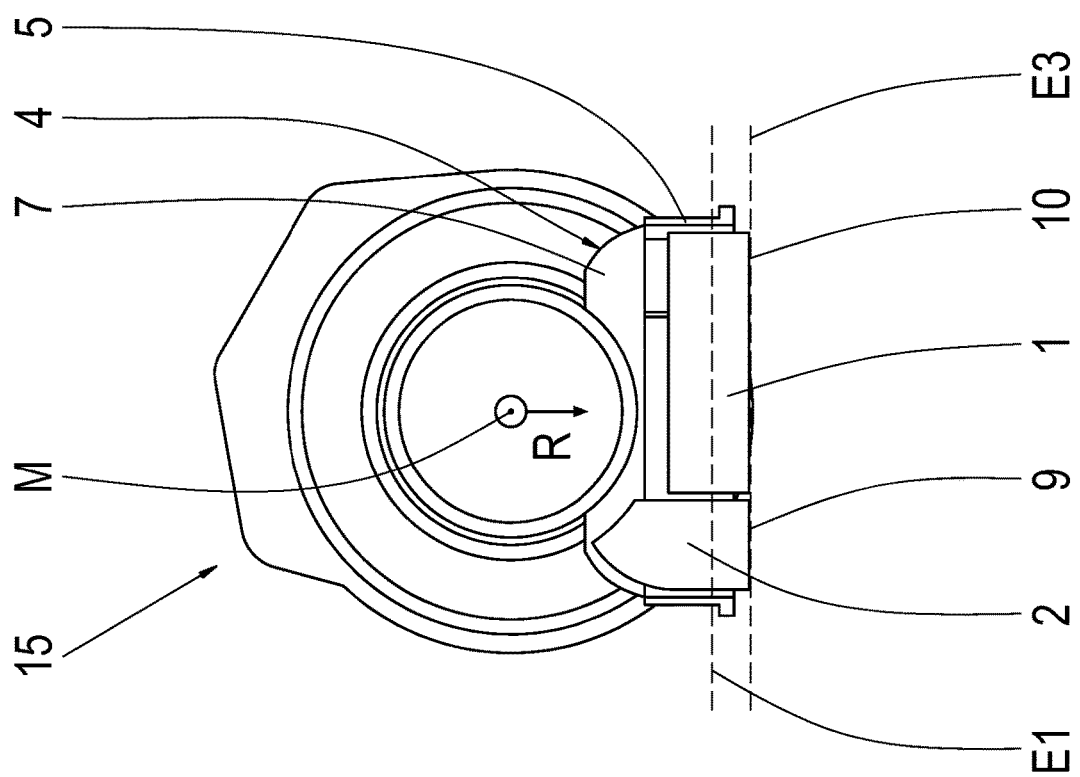
FIG. 11 shows a cross-sectional view of the transmission according to the invention, according to the third exemplary embodiment.

FIG. 11 shows a cross-sectional view of the transmission 15, which is represented in FIG. 10, along the other plane E2. The base of the hydraulic transmission control unit 1 and the power electronics unit base 9 are arranged equally far away from the transmission central axis M in the radial direction R. Therefore, the power electronics unit base 9 and the base 10 of the hydraulic transmission control unit are arranged in the further plane E3. The power electronics unit 2 and the hydraulic transmission control unit 1 are also arranged in the plane E1 which is parallel to the further plane E3. In addition, the power electronics unit 2 and the hydraulic transmission control unit 1 are offset in the tangential direction T.

FIG. 12 shows a bottom view of a transmission 15 according to a fourth exemplary embodiment, and FIG. 13 shows a cross-sectional view of the transmission 15 according to the fourth exemplary embodiment along the other plane E2. The transmission 15 according to the fourth exemplary embodiment differs from the transmission 15 according to the third exemplary embodiment, which is represented in FIGS. 10 and 11, with respect to the shape and design of the power electronics unit 2 and the hydraulic transmission control unit 1.

The power electronics unit 2 of the transmission 15 according to the fourth exemplary embodiment has a larger volume than the power electronics unit 2 of the transmission 15 according to the third exemplary embodiment. The hydraulic transmission control unit 1 according to the fourth exemplary embodiment extends further in the axial direction A than the hydraulic transmission control unit 1 according to the third exemplary embodiment and is designed to be narrower in the tangential direction T than the hydraulic transmission control unit 1 according to the third exemplary embodiment.

Figure 14:
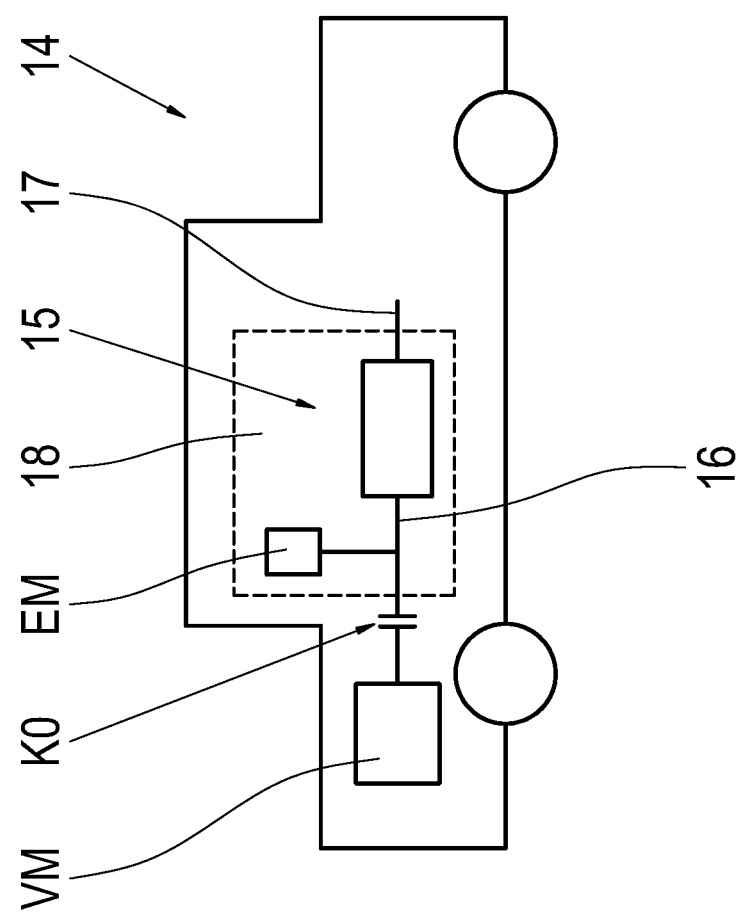
FIG. 14 shows a motor vehicle including the transmission according to the invention.

FIG. 14 shows a motor vehicle 14 including a motor vehicle drive unit VM which is, for example, an internal combustion engine, and a hybrid drive 18. The hybrid drive 18 includes the transmission 15 and an electric machine EM. The electric machine EM is operatively connected to a transmission shaft 16. The transmission shaft 16 is a transmission input shaft. The transmission 15 also includes a transmission output shaft 17 which is operatively connected to further components of the motor vehicle 14, such as an axle differential, which are not represented in FIG. 14. The transmission shaft 16 may be operatively connected to the motor vehicle drive unit VM with the aid of a clutch K0.

Modifications and variations can be made to the embodiments illustrated or described herein without departing from the scope and spirit of the invention as set forth in the appended claims.

REFERENCE CHARACTERS 1 hydraulic transmission control unit
2 power electronics 3 transmission housing
4 oil pan
5 oil pan wall
6 oil pan plate
7 cavity of the oil pan
8 cavity of the transmission housing
9 power electronics unit base
10 base of the hydraulic transmission control unit
11 protrusion
12 crosspiece
13 leg
14 motor vehicle
15 transmission
16 transmission shaft
17 transmission output shaft
18 hybrid drive
A axial direction
E1 plane
E2 other plane
E3 further plane
E4 additional plane
K0 clutch
M transmission central axis
R radial direction
T tangential direction
EM electric machine
VM motor vehicle drive unit

The invention claimed is:

1. A transmission (15) for a motor vehicle (14), comprising:
a hydraulic transmission control unit (1);
a transmission housing (3);
an oil pan (4) mounted onto the transmission housing (3); and
a power electronics unit (2) configured as a power converter for an electric machine (EM), the power electronics unit (2) supported on one or both of the transmission housing (3) and the oil pan (4),
wherein the hydraulic transmission control unit (1) is at least partially arranged next to the power electronics unit (2) along one or both of a tangential direction (T) and an axial direction (A) relative to a transmission central axis (M).

2. The transmission (15) of claim 1, wherein:
the hydraulic transmission control unit (1) and the power electronics unit (2) are arranged in a plane (E1) which extends in the tangential direction (T) and in the axial direction (A);
the power electronics unit (2) is offset with respect to the hydraulic transmission control unit (1); or
the hydraulic transmission control unit (1) and the power electronics unit (2) are arranged in the plane (E1) which extends in the tangential direction (T) and in the axial direction (A), and the power electronics unit (2) is offset with respect to the hydraulic transmission control unit (1).

3. The transmission (15) of claim 1, wherein the hydraulic transmission control unit (1) is arranged in a cavity (7) of the oil pan (4).

4. The transmission (15) of claim 1, wherein:
the power electronics unit (2) is arranged outside a cavity (7) of the oil pan (4);
the power electronics unit (2) is arranged outside a cavity (8) of the transmission housing (3); or
the power electronics unit (2) is arranged outside the cavity (7) of the oil pan (4), and the power electronics unit (2) is arranged outside the cavity (8) of the transmission housing (3).

5. The transmission (15) of claim 1, wherein a power electronics unit base (9) and an oil pan plate (6) are arranged in a further plane (E3).

6. The transmission (15) of claim 1, wherein the power electronics unit (2) is arranged in a cavity (7) of the oil pan (4).

7. The transmission (15) of claim 6, wherein the power electronics unit base (9) and a base of the hydraulic transmission control unit (1) are arranged in a further plane (E3).

8. The transmission (15) of claim 1, wherein:
the power electronics unit (2) is positioned on the transmission housing (3)
the power electronics unit (2) is positioned on an oil pan wall (5) of the oil pan (4); or
the power electronics unit (2) is positioned on the transmission housing (3) and the oil pan wall (5) of the oil pan (4).

9. The transmission (15) of claim 1, wherein the power electronics unit (2) is L-shaped, the hydraulic transmission control unit (1) is L-shaped, or both the power electronics unit (2) and the hydraulic transmission control unit (1) are L-shaped.

10. The transmission (15) of claim 9, wherein a crosspiece (12) of the power electronics unit (2) is elongated along the axial direction (A), and a leg (13) of the power electronics unit (3) is elongated along the tangential direction (T).

11. The transmission (15) of claim 9, wherein a crosspiece (12) of the hydraulic transmission control unit (1) is elongated along the axial direction (A), and a leg (13) of the hydraulic transmission control unit (1) is elongated along the tangential direction (T).

12. The transmission (15) of claim 1, wherein the power electronics unit (2) is arranged flush with the oil pan (4).

13. A hybrid drive (18) comprising the transmission (15) of claim 1 and the electric machine (EM), wherein the electric machine (EM) is electrically conductively connected to the power electronics unit (2).

14. The hybrid drive (18) of claim 13, wherein:
the electric machine (EM) is operatively connected to a transmission shaft (16);
a transmission output shaft (17) is drivable by the electric machine (EM) depending on an operating condition of the transmission (15); or
the electric machine (EM) is operatively connected to a transmission shaft (16), and the transmission output shaft (17) is drivable by the electric machine (EM) depending on the operating condition of the transmission (15).

15. A motor vehicle, comprising a motor vehicle drive unit (VM) and the transmission (15) of claim 1, wherein the motor vehicle drive unit (VM) is operatively connected to the transmission (15).

16. A motor vehicle, comprising a motor vehicle drive unit (VM) and the hybrid drive (18) of claim 13, wherein the motor vehicle drive unit (VM) is operatively connected to the hybrid drive (18).

* * * * *